Dec. 24, 1968

D. S. HOPE 3,418,033

THREE DIMENSIONAL VIEWER

Filed March 6, 1964

INVENTOR
DONALD S. HOPE

BY *John J. Byrne*

ATTORNEY

3,418,033
THREE DIMENSIONAL VIEWER
Donald S. Hope, 281 Garth Road,
Scarsdale, N.Y. 10583
Filed Mar. 6, 1964, Ser. No. 349,856
1 Claim. Cl. 350—138)

ABSTRACT OF THE DISCLOSURE

An apparatus for stereo viewing of right and left hand slide images having a slide support for holding the slides in side by side relationship, first and second magnifying means in spaced axial relationship with the right and left hand slides, first and second concave mirrors, a light source for projecting the images through the magnifying means against the mirrors at an angular disposition for reflecting the images for convergence in a plane between the mirrors and the viewing lens.

---

This invention relates generally to an optical device and method for viewing a pair of mounted stereo slides and more specifically relates to such a device which eliminates the need for polarized lenses, red and green filters, separators and the like that are normally used in close proximity to a viewer's eye to separate the right image from the left eye and the left image from the right eye.

Therefore, a principal objective of this invention is to provide an optical viewing apparatus in which a viewer may view a three dimensional image without any mechanical device being mounted on or near a viewer's eyes.

In general, the means and apparatus for obtaining this principal objective are comprised of a pair of concave mirrors which receives the separate images and reflects and converges them in a plane in space which can be viewed through a large viewing lens.

Another objective of this invention is to provide an apparatus which is conveniently housed in a supporting structure such that a viewer may adjust the spatial images to his own particular optical needs.

Another important objective of the invention is to provide a method of conveniently presenting a stereo image to an operator for comfortable viewing.

Figure 1:
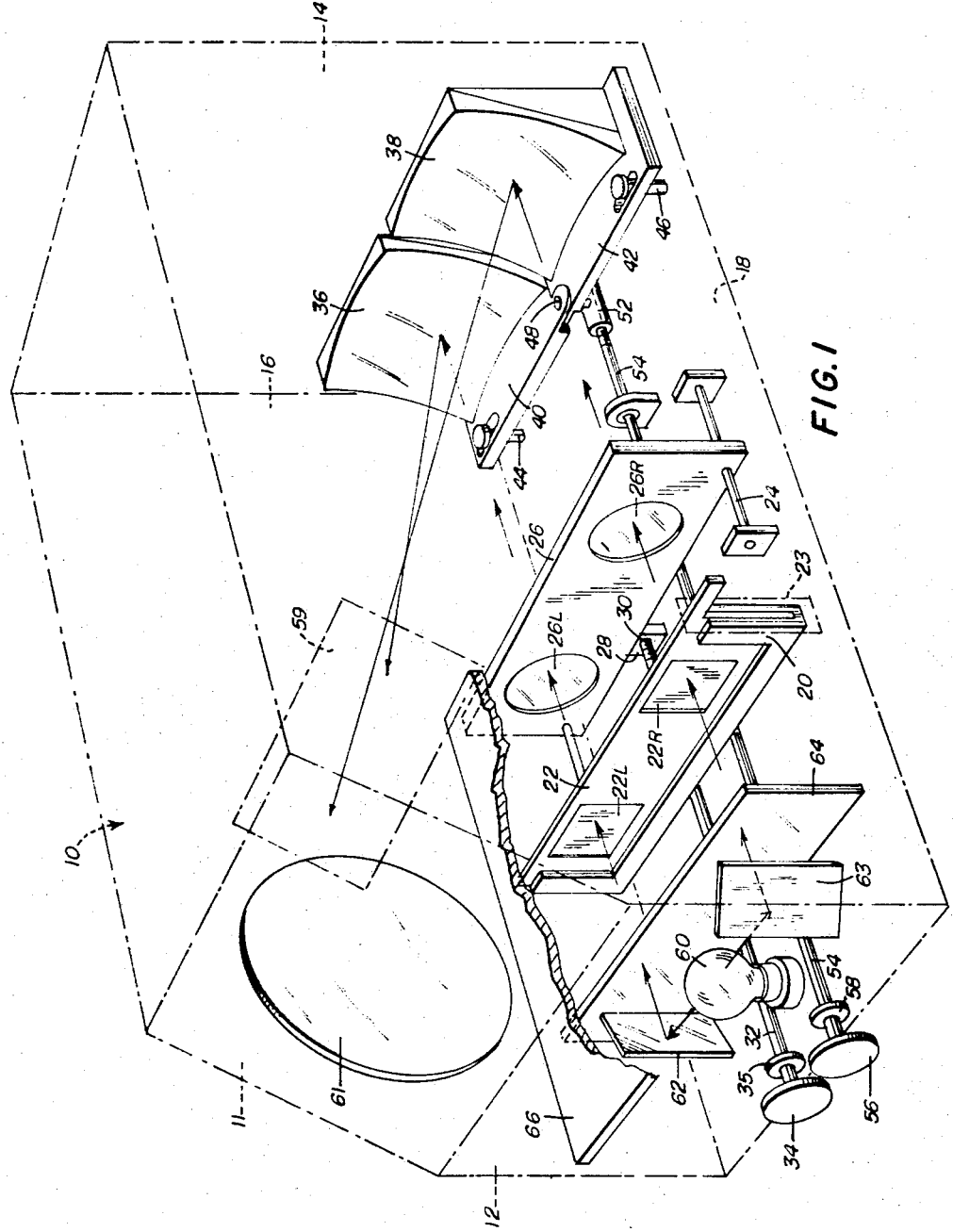
Figure 2:
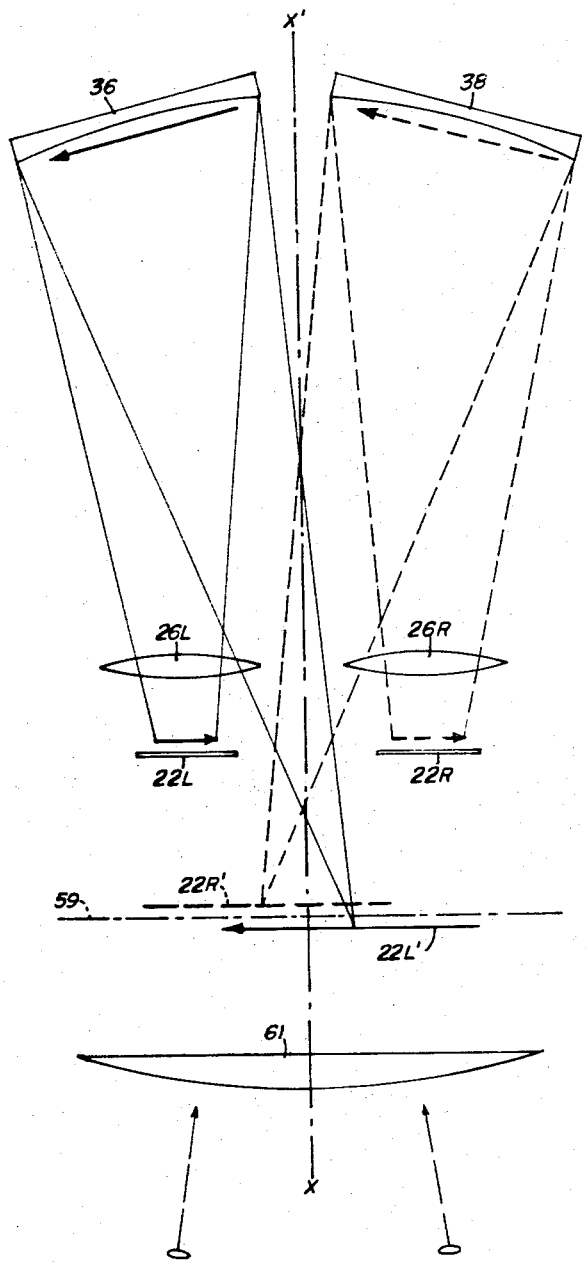

These and other important objectives and advantages of the invention will be more fully understood upon a reading of the following specifications taken in view of the attached drawings, wherein:

FIGURE 1 is a diagrammatic view showing the principal elements of the invention in perspective; and FIGURE 2 is a diagrammatic top planar view showing some of the structure disclosed in FIGURE 1.

Referring now to the drawings, wherein like elements are indicated by like numerals, the numeral 10 indicates a housing for the optical and adjustment devices of this invention. The housing is generally rectangular except for a slanted front viewing panel 11 which is spaced immediately above a control panel 12. The housing further includes a pair of side walls 14 and 16 and a bottom 18.

Intermediate the length of housing 10 is a transverse guideway 20 in which a positive image supporting slide 22 is received. The side wall 14 is slotted at 23 to provide access so that slides having different images may readily be inserted and withdrawn from the guideway. Slides 22 support image carriers 22L and 22R which respectively represent the right and left hand stereo positives of an object to be viewed.

Spaced forwardly of the guideway 20 is a second guideway 24 which supports carrier member 26 for adjustment longitudinally of the housing length. The mechanism for positioning member 26 includes an extension 28 having a threaded opening 30 therethrough. The opening is adapted to receive a threaded shaft 32 which extends longitudinally of the housing and is terminated beyond the control panel 12 by a knob 34. A bearing 35 may be used to rotatably support the shaft where it extends through the panel 12. The carrier member 26 supports a pair of magnifying members 26L and 26R which are axially in line respectively with the image carriers 22L and 22R. The adjustment feature is for focusing purposes.

Spaced forwardly of carrier 26 are a pair of concave mirrors 36 and 38. The mirrors are supported on a pair of platforms 40 and 42 which are rotatably mounted with respect to the housing on vertical pins 44 and 46 that extend upwardly from bottom 18. The platforms are formed at their front adjoining ends respectively with a pivoted joint 48 which connects with a threaded collar 52. Collar 52 receives the threaded end of an operating shaft 54 whose other end is terminated by a knob 56 adjacent the control panel 12. A bearing 58 in the control panel rotatably supports the shaft. This connection permits the front edges of the mirrors to be very close together while providing a means to adjustably and simultaneously pivot the mirrors toward each other for purposes hereinafter described.

The platforms 40 and 42 support mirrors 36 and 38 from the vertical an amount sufficient to project images received from the carriers 22L and 22R to a focus plane 59 above the members 22 and 26. The front panel 11 is tilted from the vertical approximately 30°. The front surfaces of the mirrors are off vertical one-half this amount or 15° causing the reflected image as defined by the surfaces of the mirror to be perpendicular to panel 11.

The front panel 11 supports a large plano-convex lens 61 having its optical axis extending between the mirrors 36 and 38 and is perpendicular to the line of sight as defined by the reflected rays from mirror surfaces. The viewing lens 61 has its plano side facing image plane 59.

A light source 60 is provided which is directed toward the images 26L and 26R by a pair of angularly disposed reflection mirrors 62 and 63. Disposed between the light source and the image carrier is an opal light diffuser 64. A shelf-like shield 66 extends from front panel 12 to member 26 and from side wall 16 for preventing light, other than from the projected images, from reaching the viewing lens 61.

In operation, an observer selects a desired slide 22 and inserts it through opening 23. The light source 60 is turned on causing the right hand image 26R to penetrate magnifier 26R where it is enlarged and projected to concave mirror 38. Likewise, image 22L penetrates the magnifier 26L and an enlargement thereof is projected on concave mirror 36.

Mirrors 36 and 38 are defined by a rectangular or squarish periphery generally conforming to, but larger than the peripheral outline images 22L and 22R. Otherwise, vignetting of the magnified images will occur.

Due to the off-vertical attitude of the mirrors and their inward angular disposition the images will fuse generally in the plane 59.

A reference to FIGURE 2 discloses that a complete inverting and reverting of images 22L and 22R occurs upon reflection from mirrors 36 and 38. For proper orientation, image 22L which is mounted on the left end of the slide is the right image as taken by the camera and image 22R which is mounted on the right end of the slide is the left image as taken by the camera. The image 22L, therefore, is reflected to the right of the optical axis of lens 61 and image 22R is reflected to the left thereof.

The concave mirrors 36 and 38 have focal lengths capable of locating image plane 59 inside the focus of lens 61 to thereby produce a virtual image of 22L and 22R inside the focus of lens 61 as denoted by the numerals 22L' and 22R'. The virtual images 22L' and 22R' diverge from plane 59 toward an observer and will assume a separation of about 63 millimeters (normal interpupillary distance) when the viewer is approximately 8 to 10 inches from the lens 61. The viewing lens 61 must, therefore, be larger in diameter than the interpupillary distance to reduce the amount of convergence required of the observer's eyes for comfortable viewing. The operator adjusts the positions of the mirrors 36 and 38 via knob 56 for the convergence and divergence most comfortable for him.

An observer looking through lens 61 at a reasonable viewing distance of 8 to 10 inches will see enlarged slide images of 22L and 22R. By rotating mirrors 36 and 38 about pinion 51, a lateral convergence or divergence is caused of both images. The observer may now bring both images into proper superposition; i.e., the right eye seeing only the right image and the left eye seeing only the left image. When the proper spatial relationship has been achieved, the magnified images will appear as one in its true three dimensional perspective.

In a general manner, while there has been disclosed an effective and efficient embodiment of the invention, it should be well understood that the invention is not limited to such an embodiment, as there might be changes made in the arrangement, disposition, and form of the parts without departing from the principle of the present invention as comprehended within the scope of the accompanying claim.

I claim:

1. Apparatus for stereo viewing of right and left hand images comprising a slide support for holding said right and left hand images in side-by-side spaced co-planar relationship, first and second magnifying means located at one side thereof in spaced axial relationship with said right and left hand slides, means connected to said magnifying means to adjustably move said magnifying means toward and away from said slide support, first and second interconnected concave mirrors, a light source spaced from said slide at the other side thereof and having reflecting means for respectively projecting said images through said magnifying means against said mirrors, a plano-convex viewing lens spaced upward from said mirrors, supporting means loosely mounting and disposing said mirrors for reflecting said images for convergence in a plane in space between said mirrors and said viewing lens, said supporting means including further means attached to said first and second mirrors to adjust the location of the plane of convergence by changing the angular disposition between mirrors about said interconnection.

References Cited

UNITED STATES PATENTS

| | | | |
|---|---|---|---|
| 749,046 | 1/1904 | Folmer et al. | 350—139 |
| 2,697,379 | 12/1954 | Walker | 88—24 |
| 2,889,743 | 6/1959 | Rabben | 350—137 |
| 2,891,444 | 6/1959 | Ewald | 350—131 |

DAVID SCHONBERG, *Primary Examiner.*

P. R. GILLIAM, *Assistant Examiner.*

U.S. Cl. X.R.

350—27, 299